(12) United States Patent
Nespor

(10) Patent No.: US 8,177,471 B2
(45) Date of Patent: *May 15, 2012

(54) CARGO HANDLING APPARATUS MODULE

(76) Inventor: Ronald R Nespor, Osprey, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/248,238

(22) Filed: Sep. 29, 2011

(65) Prior Publication Data

US 2012/0020764 A1   Jan. 26, 2012

Related U.S. Application Data

(63) Continuation-in-part of application No. 12/508,246, filed on Jul. 23, 2009, now Pat. No. 8,043,040, which is a continuation-in-part of application No. 11/981,345, filed on Oct. 31, 2007, now Pat. No. 7,568,877, and a continuation-in-part of application No. PCT/US2008/078345, filed on Sep. 30, 2008.

(51) Int. Cl.
*B60P 1/00* (2006.01)

(52) U.S. Cl. ........................................ 414/545; 414/544

(58) Field of Classification Search .................. 414/545, 414/546, 557, 401; 296/26.01, 26.12, 26.13
See application file for complete search history.

(56) References Cited

U.S. PATENT DOCUMENTS

| | | | |
|---|---|---|---|
| 586,641 A * | 7/1897 | Underwood | 414/541 |
| 2,621,814 A | 12/1952 | Lisota | |
| 2,774,494 A * | 12/1956 | Malmstrom | 414/546 |
| 3,174,634 A * | 3/1965 | Peck | 414/541 |
| 3,430,792 A | 3/1969 | Grove et al. | |
| 3,450,282 A | 6/1969 | Ezolt | |
| 3,485,400 A | 12/1969 | Pewthers | |
| 3,520,426 A * | 7/1970 | Hostetler | 414/545 |
| 3,776,402 A * | 12/1973 | Bryan | 414/545 |
| 3,830,384 A * | 8/1974 | Barber | 414/556 |
| 4,081,094 A | 3/1978 | Pereira et al. | |
| 4,252,491 A * | 2/1981 | Hock | 414/540 |
| 4,318,657 A | 3/1982 | Znidaric | |
| 4,578,014 A | 3/1986 | Colet | |
| 4,702,662 A | 10/1987 | Marlett | |
| 4,704,062 A | 11/1987 | Hale | |
| 4,795,303 A | 1/1989 | Bubik | |
| 4,842,470 A | 6/1989 | Hubbard | |
| 4,875,822 A | 10/1989 | Nespor | |
| 4,929,142 A | 5/1990 | Nespor | |
| 4,930,969 A * | 6/1990 | Langer | 414/540 |
| 5,006,033 A | 4/1991 | McConnell | |
| 5,061,147 A | 10/1991 | Nespor | |

(Continued)

*Primary Examiner* — Joshua Rudawitz
(74) *Attorney, Agent, or Firm* — Gold & Rizvi, P.A.; Glenn E. Gold; H. John Rizvi

(57) ABSTRACT

A goods handling' apparatus for a cargo storage and transport vehicle includes a movable cargo platform continuous with a portion of cargo enclosure floor, when the cargo platform is in an upper position. Cargo may be slid between the trailer floor and the cargo platform. A vertical actuator raises and lowers the cargo platform between the upper position and a lower position atop the ground or other vehicle support surface whereupon cargo may be slid between the cargo platform and the ground or other positions. The cargo platform is disposed substantially within the plan perimeter of the floor of the cargo module during raising and lowering. A modular system may be integrated into the cargo enclosure, or may be incorporated into a modular enclosure for appending to a cargo box of the prior art. An underside is disposed in vertically adjusting communication with the cargo platform.

20 Claims, 11 Drawing Sheets

U.S. PATENT DOCUMENTS

| | | | |
|---|---|---|---|
| 5,092,721 A * | 3/1992 | Prince | 410/26 |
| 5,176,486 A * | 1/1993 | Park | 414/472 |
| 5,246,329 A | 9/1993 | Farrell | |
| 5,249,909 A | 10/1993 | Roberts et al. | |
| 5,370,493 A * | 12/1994 | Oshima | 414/556 |
| 5,529,454 A | 6/1996 | Alm et al. | |
| 5,720,526 A | 2/1998 | Roberts | |
| 5,779,431 A | 7/1998 | Alm et al. | |
| 5,829,947 A * | 11/1998 | Litten | 414/537 |
| 5,984,614 A | 11/1999 | Weber | |
| 6,019,567 A * | 2/2000 | Lutkus et al. | 414/549 |
| 6,071,064 A * | 6/2000 | Hackett | 414/545 |
| RE36,805 E * | 8/2000 | Kempf | 414/545 |
| 6,234,740 B1 * | 5/2001 | Page | 414/545 |
| 6,276,890 B1 | 8/2001 | Pratt | |
| 6,354,785 B2 | 3/2002 | Maeno | |
| 6,461,096 B1 | 10/2002 | Mentele et al. | |
| 6,666,643 B1 * | 12/2003 | Heynssens | 414/542 |
| 7,401,860 B2 | 7/2008 | Kraenzle | |
| 7,556,467 B2 * | 7/2009 | Ablabutyan et al. | 414/557 |
| 7,568,877 B1 * | 8/2009 | Nespor | 414/545 |
| 7,762,756 B1 * | 7/2010 | Ablabutyan et al. | 414/556 |
| 7,931,433 B2 * | 4/2011 | Ablabutyan et al. | 414/557 |
| 2005/0058528 A1 * | 3/2005 | Wroblewski | 414/545 |

\* cited by examiner

CARGO HANDLING APPARATUS MODULE

CROSS-REFERENCE TO RELATED APPLICATIONS

This is a Continuation-In-Part Application claiming benefit to U.S. application Ser. No. 12/508,246, filed on Jul. 23, 2009, which is a Continuation-In-Part Application claiming benefit of both PCT International Application Serial No. PCT/US2008/078345, filed on Sep. 30, 2008 and U.S. application Ser. No. 11/981,345, filed Oct. 31, 2007 (issued as U.S. Pat. No. 7,568,877), which are hereby incorporated by reference herein in their entireties.

FIELD OF THE INVENTION

The field relates to a module having an integrated lift, the lift being provided to raise and lower cargo to and from a cargo transportation enclosure.

BACKGROUND

While lifts are known that extend off the back of a truck by folding down or by arcuately extending outward and down from the back of a truck. These lifts fail to provide for use when space behind a truck is limited, are bulky additions to the truck, and do not provide additional floor space while enclosing the lift components within the enclosure of the cargo area.

Typically, trailers and vehicles with a trailer or enclosure for hauling cargo are arranged to haul cargo within the trailer and atop a trailer floor. One such arrangement is found in a delivery truck, which includes a vertically movable lift gate, which swings down and extends rearwardly from the end of the trailer floor. Cargo is either loaded onto or off the rear lift gate and either elevated or lowered for pick up or delivery of the cargo. However, in inclement weather, the operator and the cargo may be exposed to rain or snow by being outside of the confines of the trailer. Moreover, extra room behind the, trailer-is required to accommodate the length of the lift gate and additional space to load and unload cargo therefrom.

A number of prior art systems have been developed which, in part, address this limiting aspect of the above delivery trucks. U.S. Pat. No. 4,236,747 issued Dec. 2, 1980 to Ratliff discloses a transport vehicle for medium-sized route delivery of goods. The versatile design allows for removability of the central partition in each cargo bay and adjustability of the position of the floor. A delivery truck body or trailer, which is convertible between being arranged for side loading at ground level or rear loading at dock height, is disclosed in U.S. Pat. No. 4,659,132 to Day.

Price teaches a double drop trailer with lifts therein in U.S. Pat. No. 5,092,721. A first lift comprises upper and lower platforms rigidly interconnected one to another, the second lift located in the rear section.

Three U.S. patents to Greenlaw, et al., U.S. Pat. Nos. 5,915,913, 6,328,525 and 6,474,446, teach delivery vehicles with multi-tier storage and elevator assemblies installed therein. Substantially continuous side access door provide total exterior access to the lowermost tier of cargo in the '525 patent, the '913 patent teaching elevator assemblies for multi-tier storage. The '446 patent teaches a framing system that reduces structural requirements of side walls and floors, permitting multiple Side access ports and reduced floor thickness to permit easier access from the pavement.

Recently issued U.S. Pat. No. 7,114,905 to Dibdin teaches methods and an apparatus for optimizing use of storage space in a trailer. The apparatus provides a loading apparatus for the trailer having a platform movable relative to the floor of the trailer to facilitate loading of goods.

Published application 2003/0147734 to Adams discloses a goods handling system for a vehicle or railway trailer which allows the level of access to all areas of the trailer to be improved.

An under ride is a cross member positioned below a vehicle trailer and the ground, providing a safety barrier which keeps other vehicles from encroaching under the vehicle.

Federal Motor Vehicle Safety Standard No. 224, Rear Impact Protection, requires most trailers and semi-trailers weighing over 10,000 pounds to be fitted at the rear with a rear impact (underside) guard meeting the requirements of Standard No. 223, Rear impact guards (49 CFR 571.223 and 571.224) published on Jan. 24, 1996 at 61 FR 2004).

Concerns were expressed about compatibility of undersides in conjunction with trailers and semi-trailers equipped with equipment such as liftgates. Concerns about certain incompatible equipment led NHTSA to exclude "special purpose vehicles" from the requirements of the standard. A special purpose vehicle is defined in 84 of Federal Motor Vehicle Safety Standard No. 224 as, "a trailer or semi-trailer having work-performing equipment that, while the vehicle is in transit, resides in or moves through the area that could be occupied by the horizontal member of the rear underside guard, as defined by S5.1.1 through S5.1.3. If any work-performing equipment is mounted in the guard zone, the vehicle is excluded regardless of when and how the equipment is used.

Undersides are valuable safety devices that are excluded on trailers or semi-trailers that include equipment such as liftgates. An underside design that is compatible with equipment such as liftgates is desired.

None of the known lifts provide vertically movable cargo within the confines of a trailer enclosure. Additional space is required rearwardly of the trailer for most of the known systems. Additionally, movable side cargo-receiving lifts are capable of being used for floor space for hauling Cargo.

BRIEF SUMMARY OF THE INVENTION

A goods handling apparatus for a cargo storage and transport trailer includes a movable cargo platform module forming a separate part of the trailer floor that may be continuous with the trailer floor when the cargo platform is in an upper position, and cargo may be slid between the trailer floor and the cargo platform or may remain on the platform during hauling of the cargo to a destination. A vertical actuator attached to the cargo platform raises and lowers the cargo platform between the upper position and a lower position atop the ground or other vehicle support surface or loading dock. Cargo may be slid or rolled off the platform without lifting between the cargo platform and the ground or other surface. The cargo platform is positioned substantially' within the plan perimeter of the floor of the trailer during lifting and lowering, allowing cargo to be loaded or off-loaded in tight confines not possible with known lifts.

An illustrative embodiment of the cargo storage and transport trailer includes:

a continuous, flat cargo-supported floor surface within an enclosed storage area;

a movable cargo platform forming a separate continuation of the floor surface and being generally continuous with the floor surface when said cargo platform is in an upper position whereby cargo may be slid between the trailer-floor surface and said cargo platform;

a vertical actuator attached at one end to said cargo platform and coupled to the enclosed storage area such that the vertical actuator raises and lowers said cargo platform between the upper position and a lower position atop the ground or other surface supporting the delivery truck, wherein cargo may be slid between said cargo platform and the ground or other surface supporting the delivery truck, and said cargo platform being substantially within a perimeter of the trailer floor when cargo on said cargo platform is lifted or lowered and said vertical actuator being within the enclosed storage area when said cargo platform is in the upper position and outside of the enclosed storage area when said cargo platform is in the lower position atop the ground or other surface supporting the delivery truck.

In one aspect, the cargo storage and transport trailer further includes an underride positioned spanning across a rear edge of the trailer and below a lift. The underride being vertically compensating via a biasing member.

In yet another aspect, the cargo handling apparatus may be incorporated into a conventional delivery trailer of a truck, which will lift and lower cargo within the confines of the trailer. In one example, the platform is confined to the perimeter of a module that may be modularly coupled with the truck. In one example, a modular lift extends from side of the truck allowing the lift to clear the chassis of the truck.

In yet another aspect, rear impact protection is provided by an integrated cross member that is capable of lowering and rising with the lift mechanism integrated into the rear of enclosure. In one advantage, goods handling apparatus may eliminate the need for additional working space behind or to the rear of the trailer of the vehicle by deploying and lifting a vertically movable cargo platform which is positioned within a rearward opening formed into the floor of the trailer floor and within the plan profile of the trailer (e.g. the perimeter of the enclosed area).

While in another aspect, a goods handling apparatus which extends laterally from the side of a trailer only a distance sufficient for a cargo platform to move vertically just outboard of the frame of the trailer provides for raising and lowering within the perimeter of the goods handling apparatus module.

And in another aspect, a second underride is disposed beneath the side located cargo platform. The underride being vertically compensating via a biasing member. The underride is supported via an upright frame, which slideably engages with an upright receiving channel. The biasing member is secured between the upright receiving channel and the upright frame member.

BRIEF DESCRIPTION OF THE FIGURES

The invention will now be described, by way of example, with reference to the accompanying drawings, in which.

Examples are illustrated in the drawings and are described herein. It is intended that the embodiments and figures disclosed herein should be considered illustrative rather than limiting. Like reference numerals refer to like parts throughout the various views of the drawings.

DETAILED DESCRIPTION OF THE INVENTION

Figure 1:
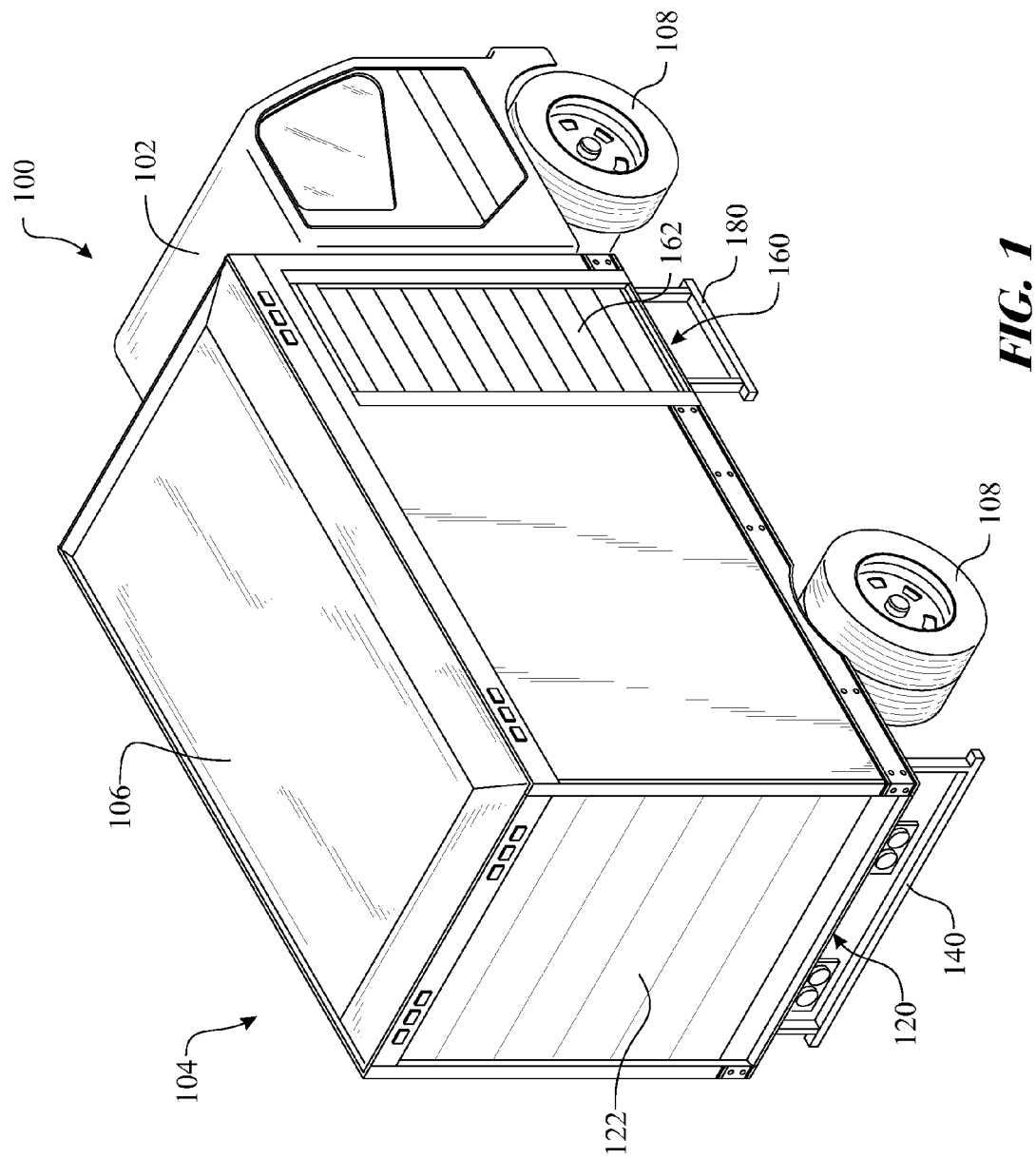
FIG. 1 is an isometric view of a cargo vehicle showing several embodiments of the invention view of FIG. 1.
Figure 2:
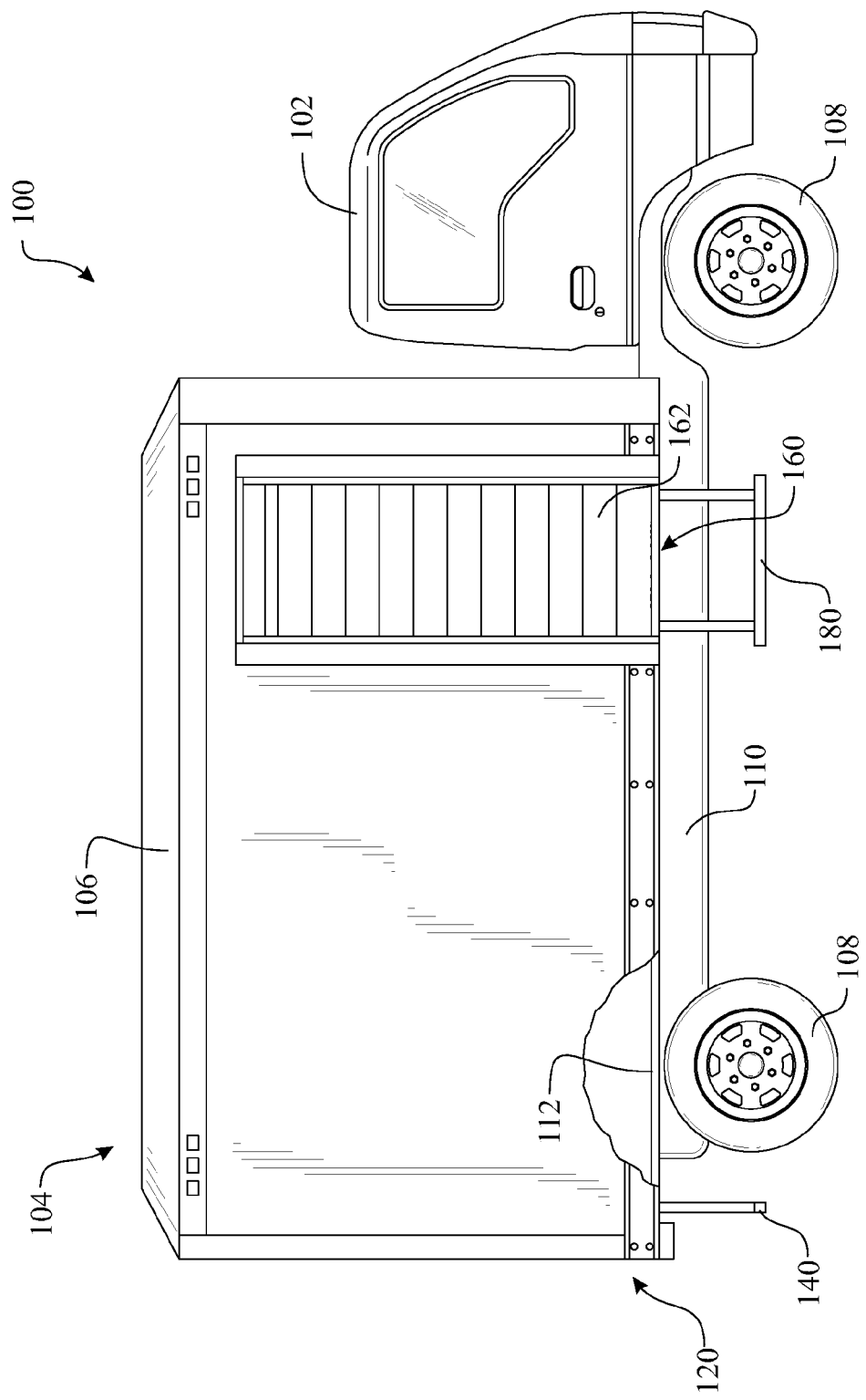
FIG. 2 is a side elevation view of the cargo vehicle of FIG. 1.
Figure 3:
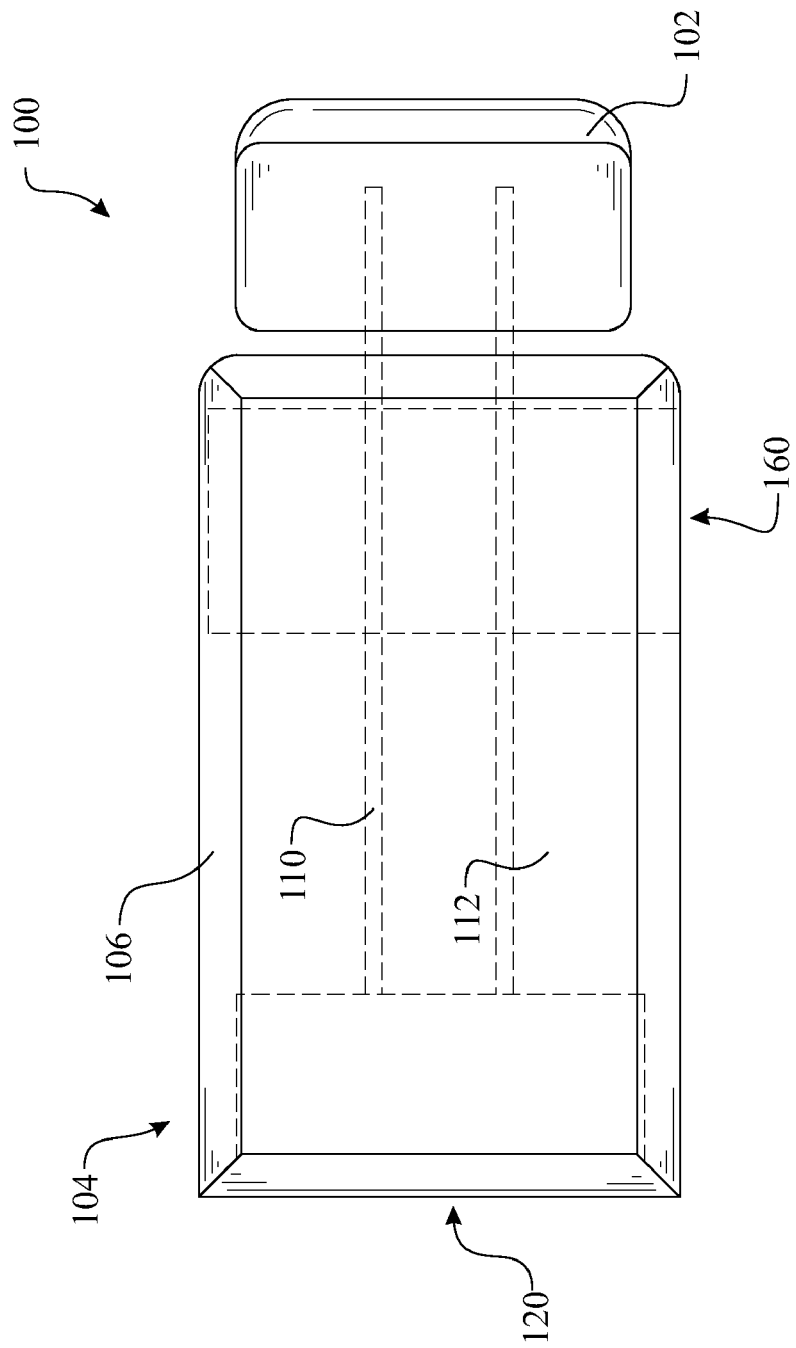
FIG. 3 is a top plan view of the cargo vehicle of FIG. 1.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

A cargo storing and transport vehicle 100 is presented illustrating various elements contributing to the present invention, which are described in FIGS. 1 through 9. Referring now to the drawings, an otherwise cargo storing and transport vehicle 100 is shown and includes a truck 102 and a trailer assembly 104. A trailer assembly 104 includes a trailer body 106 defining an enclosure above a trailer floor 112 and having a longitudinal trailer frame 110, which may be formed as an integral part of the truck 102.

Two examples of integrated lift platforms 120, 160 are illustrated. The examples may be combined in a single trailer assembly 104 or may be used separately. In one example, a movable rear cargo platform 124 is rectangular, but may be of any convenient shape or size and may have a tapered lip or ramp 126 along the rearwardly distal edge, for example. This example includes a pair of rear upright frame members 130 rigidly connected at each rearwardly corner of the movable rear cargo platform 124 or at least within the enclosure when the platform is raised. Each are upwardly engaged into one of two vertical actuator channels 132 and operated via a respective vertical actuator 134. These vertical actuator channels 132 may be rigidly attached or affixed to an inner surface of the trailer body 106 or an intermediate support in an upright orientation within the enclosure of the trailer body 106. Functionality of the lift 120, 160 is best described in FIGS. 9 and 10 disclosed herein.

The trailer floor 112 includes a rear platform floor cutout 114, which may be formed in the distal rearward portion of the trailer floor 112. The opening substantially mates with and receives the movable rear cargo platform 124 so that, when the movable rear cargo platform 124 is in the upper position, top-most surface of the movable rear cargo platform 124 is substantially continuous with and uninterrupting of the movable rear cargo platform 124 so that cargo within the trailer body 106 may be slid onto or from the movable rear cargo platform 124 without the need for lifting or use of a wheeled cart or hand truck, for example.

Figure 4:
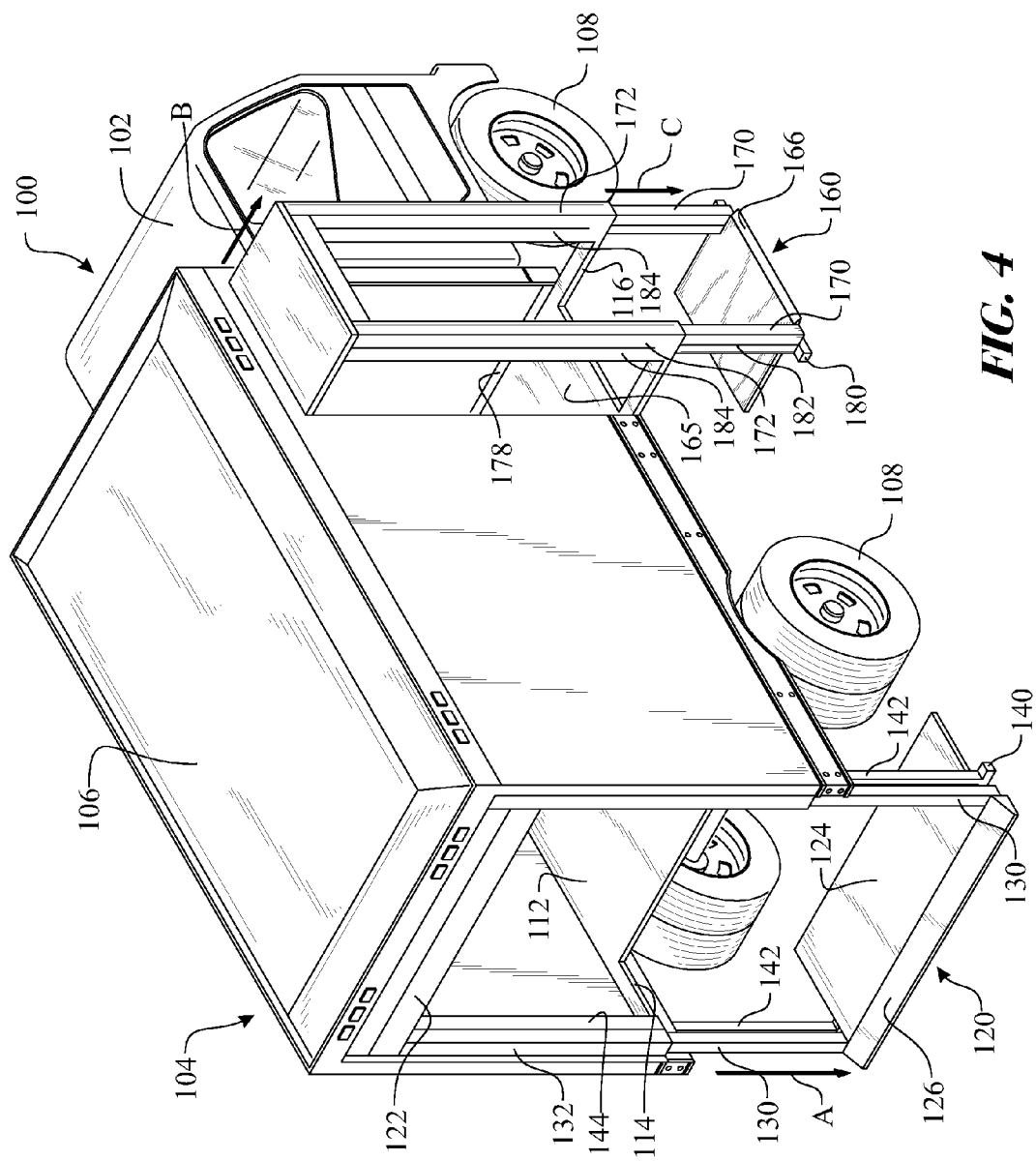
FIG. 4 is another isometric view of the cargo vehicle of FIG. 1 showing several embodiments of the invention in a deployed configuration.
Figure 5:
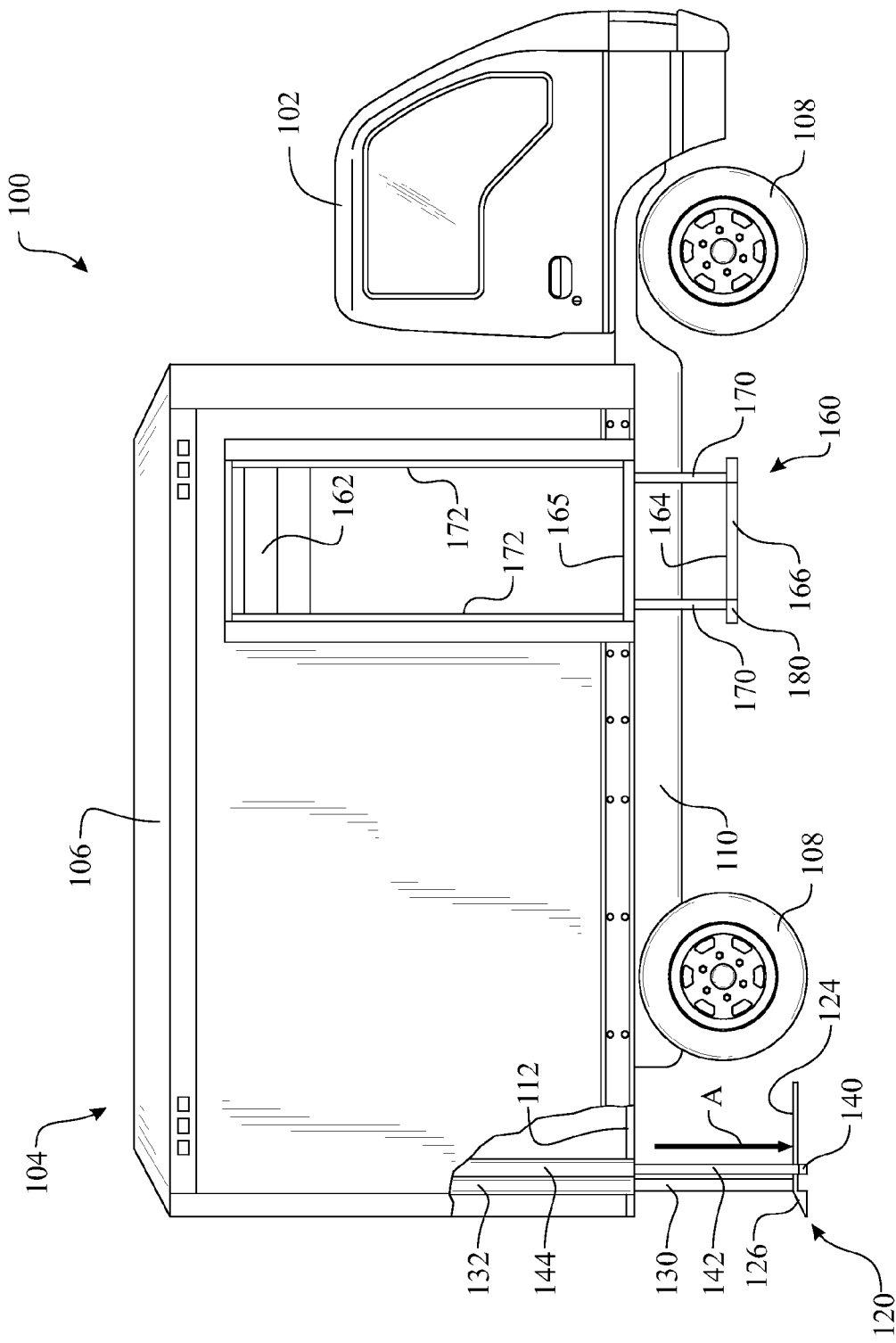
FIG. 5 is a side elevation view of the cargo vehicle illustrating the two cargo lifts in a partially lowered configuration.
Figure 6:
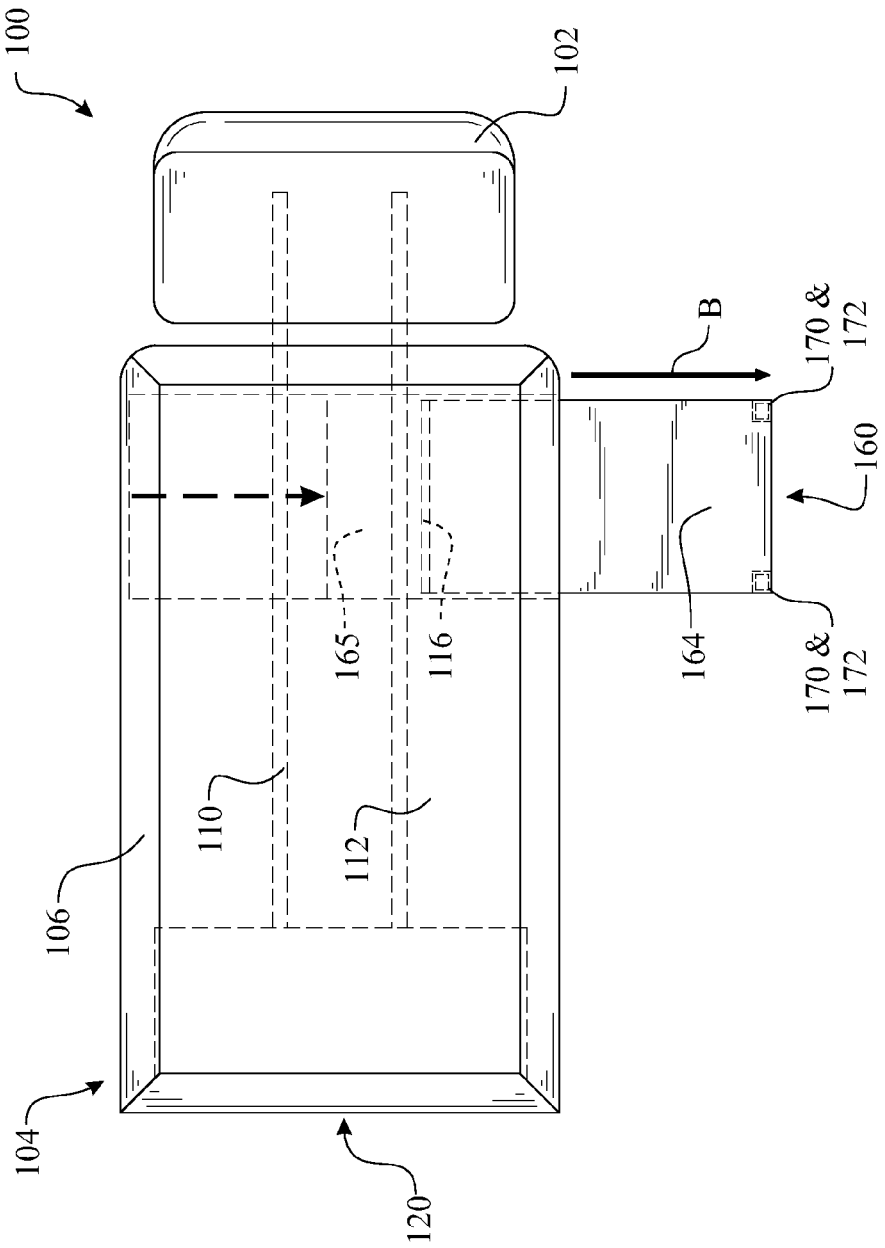
FIG. 6 is a top plan view of the cargo vehicle illustrating a side cargo lifting platform in a deployed configuration.
Figure 7:
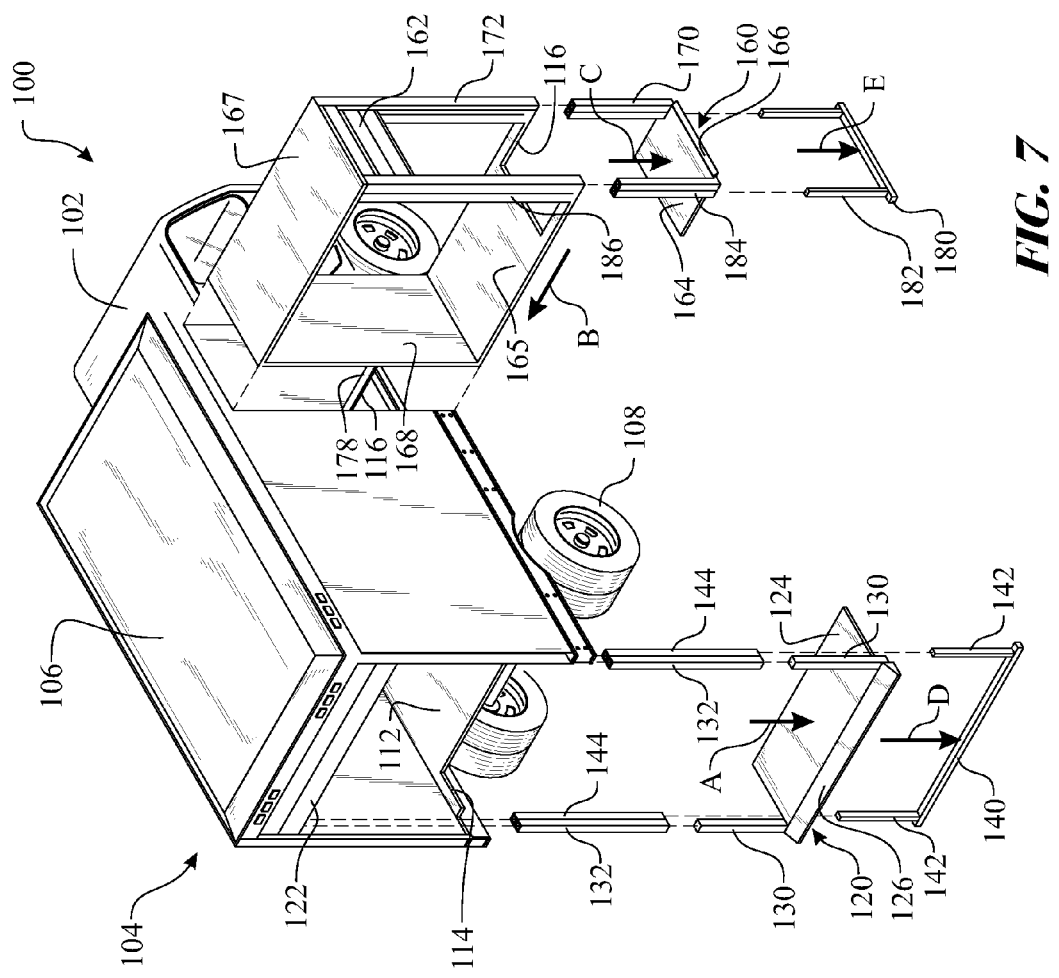
FIG. 7 is an isometric exploded view of the cargo vehicle illustrating the components of the present invention.
Figure 9:
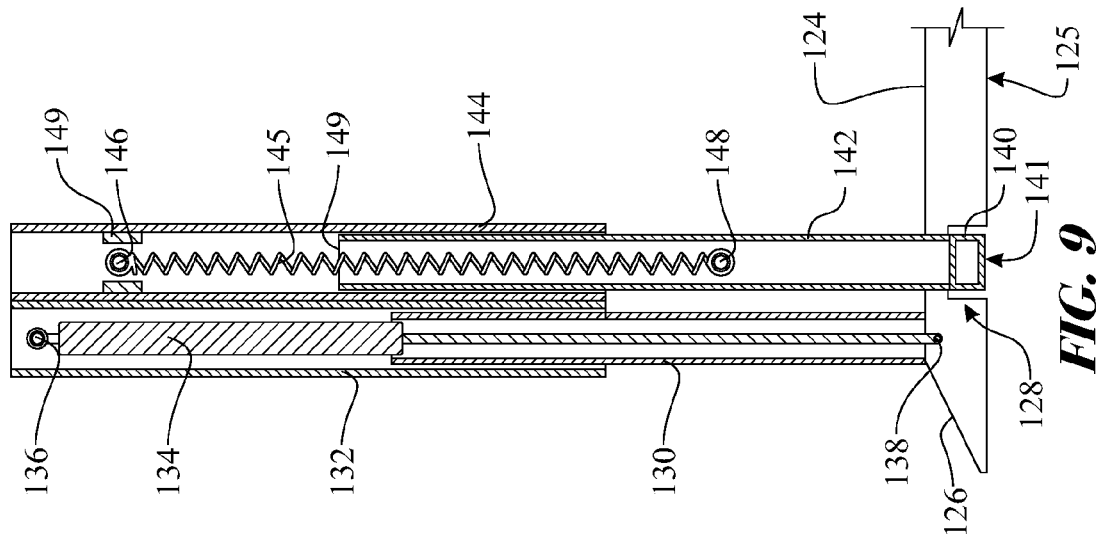
FIG. 9 is a detailed sectioned side view of the exemplary actuator and underside protection of FIG. 8, illustrated having a lift platform in a lowered configuration.
Figure 8:
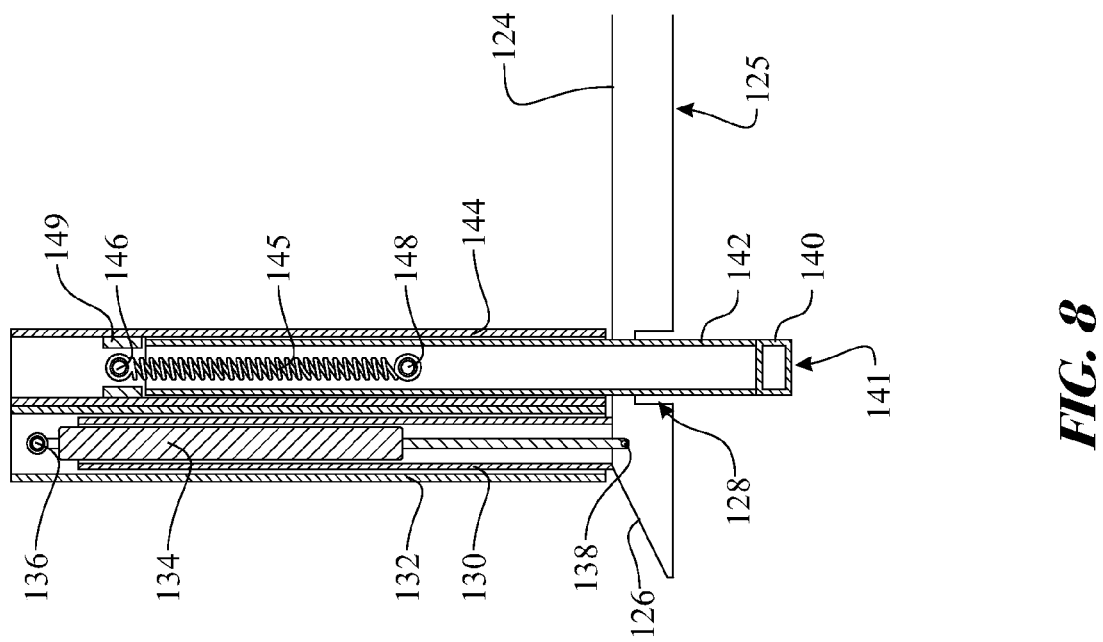
FIG. 8 is a detailed sectioned side view of an exemplary actuator and underside protection, illustrated having a lift platform in a stored configuration.

An overhead-type rear door 122, shown in the open position in FIGS. 4, 5, and 7 and in the closed position in FIG. 1, may completely enclose the trailer body 106, including all of the components of the rear cargo handling apparatus and lift assembly 120. During inclement weather, a movable rear door 122 may be left closed while the rear cargo handling apparatus and lift assembly 120 is loaded with cargo (not shown, but well understood) and then moved downwardly by vertical actuator 134 to the lowered position resting atop the ground or other vehicle support surface, that movement being in the direction of arrow A as illustrated in FIGS. 4 and 5. The rear door 122 may be opened a distance sufficient for removal of the cargo from the movable rear cargo platform 124. Note importantly that, as best seen in the top plan view of FIGS. 3 and 6, the amount of rearwardly space required for loading and off loading of cargo from the trailer body 106 is reduced compared to known lifts. A similar side door 162 can be provided respective to a side cargo handling apparatus and lift module 160.

In one example, an underride member 140 includes spaced underride upright frames 142, which are coupled movably by spring biased coupling member 145 placed within an underride vertical support channel 144, for example. The height and position rearwardly of the trailer body 106 prevent other vehicles from sliding beneath the truck during an unintended rear-end collision with the cargo storing and transport vehicle 100. In one example, underride upright frame 142 may be downwardly deployed (via Arrow D) the underride member 140 upon engagement with the movable rear cargo platform 124, when the movable rear cargo platform 124 is lowered, as disclosed in more detail in reference to FIGS. 8 and 9.

An example of a side cargo handling apparatus and lift module 160 includes an additional feature of a side module movable cargo platform 164 having a side module floor 165, an module back panel 168, two side lift vertical actuator and channels 172 and an module top panel 167. The side cargo handling apparatus and lift module 160 also includes a side module movable cargo platform 164, which, in the upper position, just closely fits within a side module floor cutout 116 so that the side module movable cargo platform 164 is continuous with and uninterruptive of the side module floor 165.

To deploy this side cargo handling apparatus and lift module 160, a track 178 connected within the trailer body 106, in one example, is laterally oriented at approximately the trailer floor level. The track 178 will move the side cargo handling apparatus and lift module 160 outwardly (horizontally) in the direction of arrow B, as best seen in FIGS. 4 and 6. When the side module movable cargo platform 164 clears the longitudinal trailer frame 110, the side module movable cargo platform 164 may be lowered in the direction of arrow C by vertical actuators (similar to vertical actuator 134) contained within the side lift vertical actuator and channel 172 until the side module movable cargo platform 164 comes to rest atop the ground or otherwise. The side lift vertical actuator and channels 172 provide stability, guiding the side upright frame member 170 during vertical motion. Cargo loading and unloading onto or from the interior of the trailer body 106 is facilitated as the side cargo handling apparatus and lift module 160 may be installed anywhere along the length of the trailer and on either side for convenience or special delivery needs. A ramp 166 can be disposed along the outer edge of the side module movable cargo platform 164 for aiding loading and unloading of cargo from the platform 164. The side underside member 180 is partially obscured by the ramp 166 and side module movable cargo platform 164 when the side module movable cargo platform 164 is lowered as illustrated in FIGS. 4 and 5.

A rear impact protection system is integrated with the lift mechanism and illustrated throughout the drawings. Detailed operation sectional views are presented in FIGS. 8 and 9. For example, a underside member 140 is coupled to a movable rear cargo platform 124, which may be raised or lowered, by coupling a underside upright frame 142 to a underside vertical support channel 144 via a spring biased coupling member 145 disposed within the underside vertical support channel 144. Both the underside vertical support channels 144 and the movable rear cargo platform 124 may be mounted to the trailer body 106, 206 of the cargo storing and transport vehicle 100 by vertical actuators 134. The spring biased coupling member 145 is preferably a tension spring secured to the underside vertical support channel 144 via a biasing member channel mount 146 provided at an upper end of the spring biased coupling member 145. The spring biased coupling member 145 is secured to the underside upright frame 142 via a biasing member under ride upright mount 148 provided at a lower end of the spring biased coupling member 145. Each of the vertical actuators 134 may be enclosed within a respective vertical actuator channel 132. The vertical actuator channels 132 are schematically illustrated in the exploded view of FIG. 7, for example, and are illustrated with additional detail in FIGS. 8 and 9. The vertical actuator 134 is secured to the vertical actuator channel 132 via an actuator channel mount 136 provided at an upper end of the vertical actuator 134. The vertical actuator 134 is secured to the movable rear cargo platform 124 or rear upright frame member 130 via a actuator lift mount 138 provided at a lower end of the vertical actuator 134. The vertical actuator 134 is preferably a bi-directional, hydraulically operated piston. Alternates include a screw drive, a cable lift, a rack and pinion lift, an electromechanical lift, and the like. Vertical motion and stability of the movable rear cargo platform 124 is provided via the engagement between the rear upright frame member 130 and the vertical actuator channel 132. A detailed view of two of the underride vertical support channels 144 for one of the underride upright frame 142 shows a spring biased coupling member 145 coupling the underride upright frame 142 to underride member 140. One or more limiting devices 149 may be provided to limit the maximum extent of the movement of the underride upright frame 142 in the upward direction respective to the underride vertical support channel 144. As the movable rear cargo platform 124 moves downward, the underride member 140 may remain stationary until the platform reaches the underride member 140. Then, the movable rear cargo platform 124 and the underride member 140 may continue to move downward together. An underride receiving notch 128 can be provided in a cargo platform bottom surface 125 of the movable rear cargo platform 124 for receiving the underride member 140. This configuration positions a underride member bottom surface 141 of the underride member 140 flush with the cargo platform bottom surface 125, allowing the movable rear cargo platform 124 to be lowered onto the ground. As the movable rear cargo platform 124 is raised upwardly, the underride member 140 may be raised, also, until the underride upright frame 142 reaches the limiting devices 149, for example, which limiting devices 149 positions the underride member 140, at a height to provide for rear impact protection.

A similar underride system can be provided along a side of the vehicle, positioning a side underride member 180 under the side cargo handling apparatus and lift module 160. A pair of side underride upright frames 182 extends upwardly from the two outer ends of the side underride member 180 engaging with a module underride vertical support channel and biasing member 184. The side underride assembly is similar to the rear underride assembly 140, 142, 144 previously disclosed herein. The side underride member 180 adjusts vertically in accordance with Arrow E.

Figure 10:
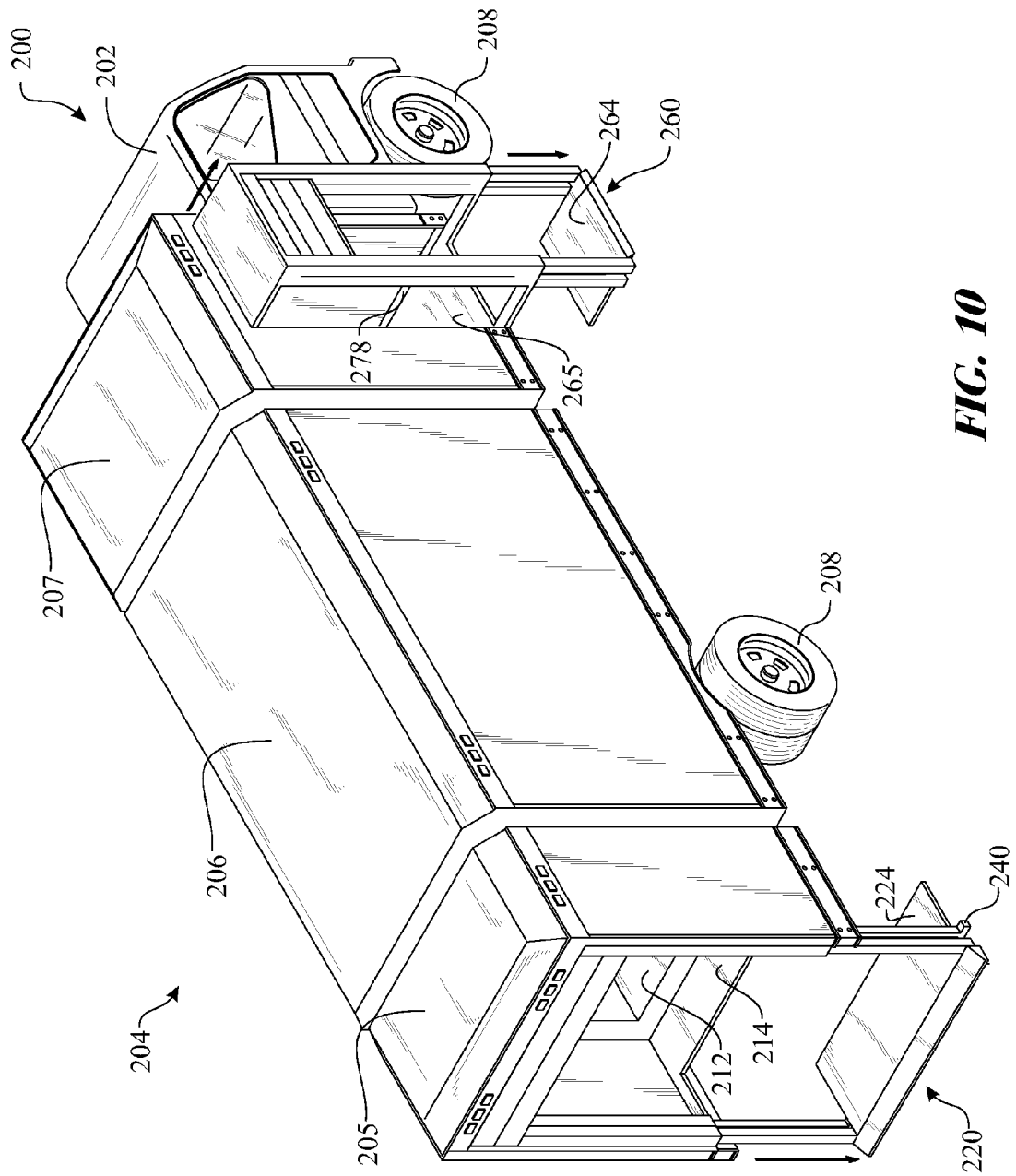
FIG. 10 is an isometric partially exploded view of additional embodiments of the present invention incorporating trailer modules.
Figure 11:
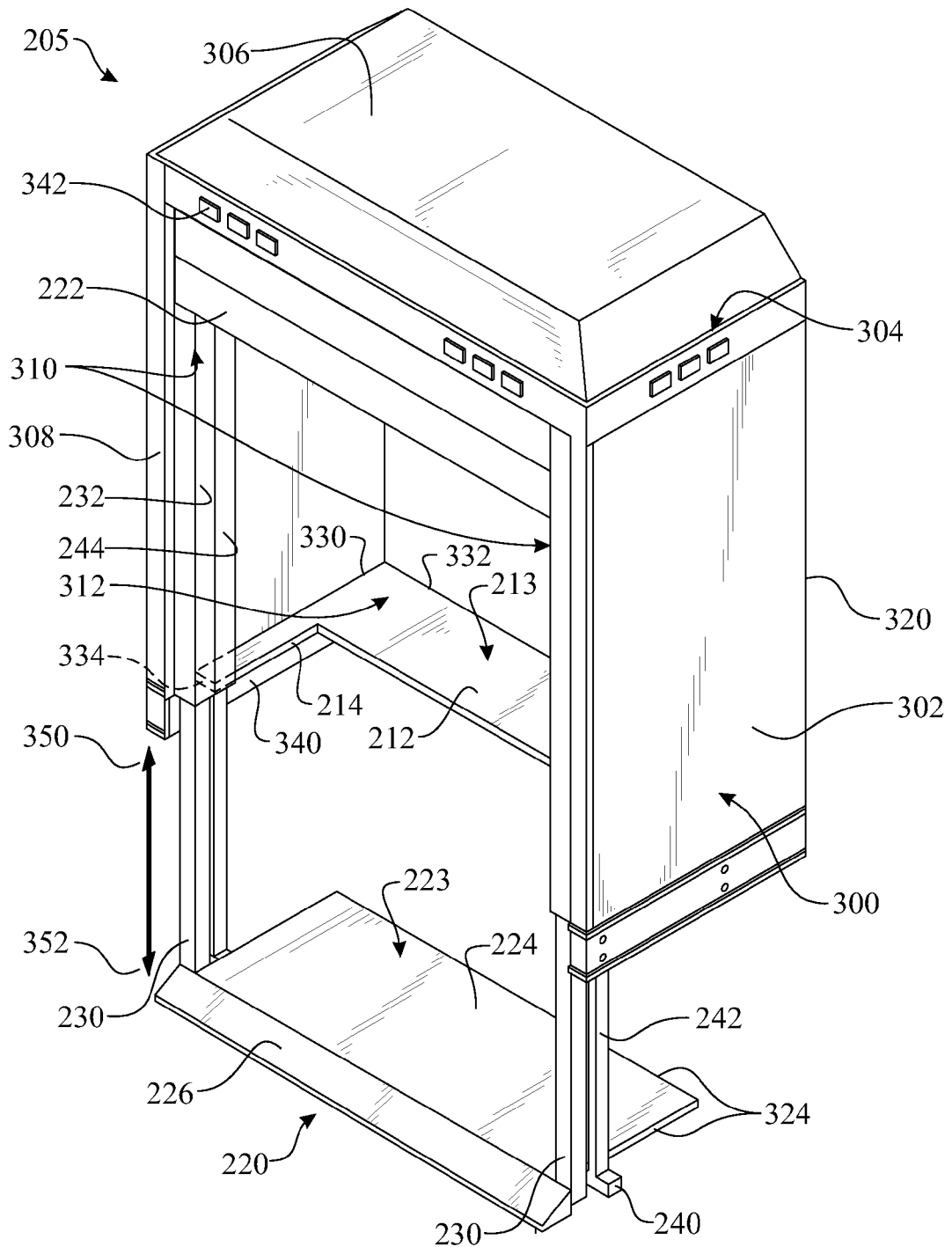
FIG. 11 is a detailed isometric view of a rear cargo handling add-on module originally introduced in FIG. 10.
Figure 12:
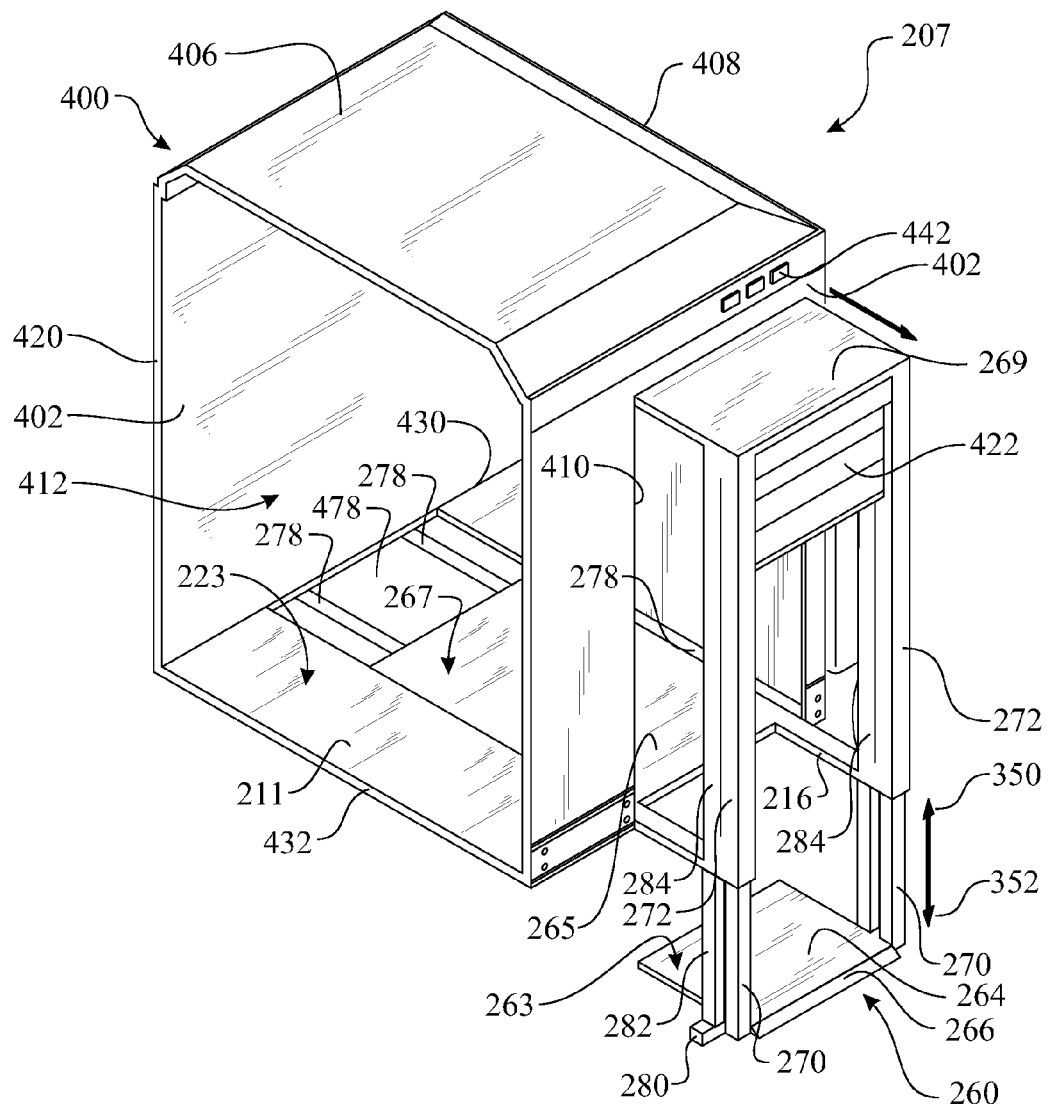
FIG. 12 is a detailed isometric view of a front cargo handling add-on module originally introduced in FIG. 10.

Referring now to FIGS. 10 through 12, a cargo storage and transport vehicle 200 and includes a truck 202, a frame (not shown, but understood to be similar to longitudinal trailer frame 110), a plurality of wheels 208, and one or more modular lift assemblies 220, 260. A majority of the elements of the illustrated embodiment are similar to those of the embodiment illustrated in FIGS. 1 through 9. The use of modular sections enables an end user to assemble and remove the modular sections from any vehicle, trailer, cargo container and the like.

The modular lift assembly 220, 260 may be installed within a self-contained, handling add-on module 205, 207 respectively. The rear cargo handling add-on module 205 is assembled about a rear portion of an intermediate trailer section 206. The front cargo handling add-on module 207 is assembled about a forward portion of an intermediate trailer section 206. The rear cargo handling add-on module 205 and the front cargo handling add-on module 207 are independently configured to the intermediate trailer section 206, forming the trailer assembly 204. Like features of the modular lift components and the underside systems presented in FIGS. 10 through 12 and the integrated lift components and the underside systems presented in FIGS. 1 through 9 are numbered the same except preceded by the numeral '2'.

In more detail, the rear cargo handling add-on module 205 includes a module body shell 300. The module body shell 300 is fabricated having a module floor 212, a pair of module sidewalls 302, and a module roof 306. The module floor 212 is arranged in a generally horizontal orientation and defined by a pair of generally parallel side edges 330, an attachment edge 332, and a trailing edge 334. Each module sidewalls 302 are arranged generally perpendicular to the module floor 212, wherein the module floor 212 is located proximate a lower edge of the module sidewalls 302. A module roof 306 spans between the sidewall upper edges 304 of each module sidewalls 302. The module floor 212, pair of module sidewalls 302 and the module roof 306 collectively form a tubular shaped structure, preferably in a rectangular cross sectional shape. The tubular shaped structure defines a module interior space 312. A module end wall 308 is affixed to one end of the tubular structure. A module attachment edge 320 is defined at an opposite end thereof. A cargo opening 310 is provided through the module end wall 308, providing access to the module interior space 312. A rear door 222 is operably attached to the module end wall 308 providing a closure and access passageway to the module interior space 312. The rear door 222 can be provided in a hinged panel form factor; a roll up, multi-panel form factor; and the like. An attachment interface (not shown) can be integrated into the module attachment edge 320 for ease of attachment and removal from a mating container. The attachment interface can include a weatherproof seal to minimize transfer of weather, temperature, etc. between the module interior space 312 and an exterior of the module body shell 300.

A rear cargo handling apparatus and lift assembly 220 includes a movable rear cargo platform 224, which is moveably assembled to the module body shell 300 by a pair of rear upright frame members 230. A floor platform clearance 214 is formed through the module floor 212 for receiving the movable rear cargo platform 224. The rear upright frame member 130 locates the movable rear cargo platform 224 in a container transfer position 350, where a platform upper surface 223 of the movable rear cargo platform 224 becomes coplanar with a floor upper surface 213 of the module floor 212. The floor platform clearance 214 extends inward from trailing edge 334 of the module floor 212, where the trailing edge 334 is located adjacent to the cargo opening 310. The floor platform clearance 214 is defined by a clearance peripheral edge that is sized and shaped to mate with a platform peripheral edge 324. The movable rear cargo platform 224 is lowered to a ground transfer position 352 by vertically positioning the rear upright frame member 230 within the vertical actuator channel 232. It is understood that the vertical motion of the movable rear cargo platform 224 can be provided by any form factor of a vertical actuator.

Similarly, the front cargo handling add-on module 207 includes a module body shell 400. The module body shell 400 is fabricated having a module floor 212, a pair of module sidewalls 402, and a module roof 406. The module floor 211 is defined by a pair of generally parallel side edges 430, an attachment edge 432, and a leading edge (not shown), the module floor 211 being arranged in a generally horizontal orientation. Each module sidewall 402 are arranged generally perpendicular to the module floor 211, wherein the module floor 211 is located proximate a lower edge of the module sidewall 402. A module roof 406 spans between the sidewall upper edge 404 of each module sidewall 402. The module floor 211, pair of module sidewalls 402 and the module roof 406 collectively form a tubular shaped structure, preferably in a rectangular cross sectional shape. The tubular shaped structure defines a module interior space 412. A module end wall 408 is affixed to one end of the tubular structure. A module attachment edge 420 is defined at an opposite end thereof. A cargo opening 410 is provided through one of the module sidewalls 402, providing access to the module interior space 412. An attachment interface (not shown) can be integrated into the module attachment edge 420 for ease of attachment and removal from a mating container. The attachment interface can include a weatherproof seal to minimize transfer of weather, temperature, etc. between the module interior space 412 and an exterior of the module body shell 400.

Operation of each of the lifts 220 and 260 is similar to lifts 120, 160 previously described. The rear cargo handling apparatus and lift assembly 220 comprises a movable rear cargo platform 224, which transports objects between an intermediate trailer floor 212, the module section floor 214, and the ground. The module section floor 212 comprises a floor platform clearance 214 which substantially mates with and receives the movable rear cargo platform 224 so that, when the movable rear cargo platform 224 is in the upper position, referred to as a container transfer position 350, top-most surface 223 of the movable rear cargo platform 224 is substantially continuous with and uninterrupting with the floor platform clearance 214 of module section floor 214 so that cargo within the rear cargo handling add-on module 205 may be slid onto or from the movable rear cargo platform 224 without the need for lifting or use of a wheeled cart or hand truck, for example.

Similarly, the side cargo handling apparatus and lift module 260 comprises a side module movable cargo platform 264, which transports objects between a side module floor 265 and the ground. The side cargo handling apparatus and lift module 260 includes a frame assembly including a horizontal lower component (the side module floor 265), a vertical component (a pair of side lift vertical actuator and channels 272), and a horizontal upper component (platform assembly upper member 269). The pair of side lift vertical actuator and channels 272 or a similar facade defines an opening or access passageway. A side platform door 422 is operably located within the opening formed by the pair of side lift vertical actuator and channels 272. At least one track 278 is incorporated within the front cargo handling add-on module 207, wherein the at least one track 278 provides horizontally transport of the side cargo handling apparatus and lift module 260. A side module floor clearance 478 can be provided within said module floor 211 for receiving said side module floor 265. The side module floor 265 is substantially continuous with and uninterrupting with the respective module floor 211 of the front cargo handling add-on module 207. The side module floor 265 comprises a floor platform clearance 216 which substantially mates with and receives the side module movable cargo platform 264 so that, when the side module movable cargo platform 264 is in the upper position 350, top-most surface 263 of the side module movable cargo platform 264 is substantially continuous and uninterrupting with the floor platform clearance 216 of the side module floor 265 so that cargo within the front cargo handling add-on module 207 may be slid onto or from the side module movable cargo platform 264 without the need for lifting or use of a wheeled cart or hand truck. The modularity may be used for any cargo truck. Refrigerated cargo spaces may benefit from an interlock or curtain that reduces the amount of cooled air that escapes from the cargo enclosure during loading and off-loading.

The modules 205, 207 can include various additional features, such as a support frame 340, exterior lights 342, and the like, to aid in either functionality, reliability, legal requirements, and the like.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A cargo handling module, the module comprising:
    a module body shell comprising:
        a module floor,
        a pair of module body sidewalls, each module body sidewall attached to a respective edge of and arranged generally perpendicular to said module floor, and
        a module roof spanning between an upper edge of each module body sidewall,
        wherein the module floor, the pair of module sidewalls, and the module roof collectively form a tubular shaped structure,
        an end wall provided at a first end of said tubular shaped structure, and
        an attachment edge provided opposite said end wall, wherein said attachment edge is sized and shaped to mate with an end wall of a cargo transportation enclosure,
        wherein said combination of said tubular shaped structure and said end wall defines an interior space;
    a cargo opening for passage of cargo therethrough, said cargo opening provided through one of said end wall and said sidewall;
    a platform having and upper surface defined by a platform peripheral edge;
    a floor platform clearance within said module floor, said floor platform clearance extending inward from an edge of said module floor adjacent to said cargo opening, said floor platform clearance comprising a clearance peripheral edge that is sized and shaped to mate with said platform peripheral edge; and
    a vertical actuator integrated into said cargo handling module, said vertical actuator vertically positions said platform between a container transfer position aligning said platform upper surface and said floor upper surface and a ground transfer position locating said platform upper surface below said floor upper surface.

2. A cargo handling module as recited in claim 1, said platform upper surface is substantially continuous with and uninterrupting with an adjacent section of said respective module floor of said module body shell when said platform is raised to a container transfer position.

3. A cargo handling module as recited in claim 1, said the vertical actuator further comprising an upright frame member slideably engaging with a vertical actuator channel.

4. A cargo handling module as recited in claim 1, said cargo handling module further comprising an underside, said underside comprising at least one vertical support component and a horizontal safety component, said underside extending downward from said module body shell and located proximate a rear section of said cargo handling module.

5. A cargo handling module as recited in claim 4, said at least one vertical support component is extendable wherein said horizontal safety component is vertically positioned in conjunction with a vertical motion of said platform.

6. A cargo handling module as recited in claim 1, said cargo handling module further comprising a cargo access door providing closure to said cargo opening.

7. A cargo handling module as recited in claim 1, said cargo handling module further comprising a releasable attachment interface provided along said module attachment edge.

8. A cargo handling module, the module comprising:
    a module body shell comprising:
        a module floor,
        a pair of module body sidewalls, each module body sidewall attached to a respective edge of and arranged generally perpendicular to said module floor, and
        a module roof spanning between an upper edge of each module body sidewall,
        wherein the module floor, the pair of module sidewalls, and the module roof collectively form a tubular shaped structure,
        an end wall provided at a first end of said tubular shaped structure, and
        an attachment edge provided opposite said end wall, wherein said attachment edge is sized and shaped to mate with an end wall of a cargo transportation enclosure,
        wherein said combination of said tubular shaped structure and said end wall defines an interior space;

a cargo opening for passage of cargo therethrough, said cargo opening provided through one of said end wall and said sidewall;

a platform having and upper surface defined by a platform peripheral edge;

a floor platform clearance within said module floor, said floor platform clearance extending inward from an edge of said module floor adjacent to said cargo opening, said floor platform clearance comprising a clearance peripheral edge that is sized and shaped to mate with said platform peripheral edge; and a vertical actuator integrated into said cargo handling module, said vertical actuator vertically positions said platform between a container transfer position aligning said platform upper surface and said floor upper surface and a ground transfer position locating said platform upper surface below said floor upper surface; and a cargo access door providing closure to said cargo opening.

9. A cargo handling module as recited in claim 8, said platform upper surface is substantially continuous with and uninterrupting with an adjacent section of said respective module floor of said module body shell when said platform is raised to a container transfer position.

10. A cargo handling module as recited in claim 8, said the vertical actuator further comprising an upright frame member slideably engaging with a vertical actuator channel.

11. A cargo handling module as recited in claim 8, said cargo handling module further comprising an underride, said underride comprising at least one vertical support component and a horizontal safety component, said underride extending downward from said module body shell and located proximate a rear section of said cargo handling module.

12. A cargo handling module as recited in claim 11, said at least one vertical support component is extendable wherein said horizontal safety component is vertically positioned in conjunction with a vertical motion of said platform.

13. A cargo handling module as recited in claim 8, said cargo handling module further comprising a releasable attachment interface provided along said module attachment edge.

14. A cargo handling module, the module comprising:
a module body shell comprising:
a module floor,
a pair of module body sidewalls, each module body sidewall attached to a respective edge of and arranged generally perpendicular to said module floor, and
a module roof spanning between an upper edge of each module body sidewall,
wherein the module floor, the pair of module sidewalls, and the module roof collectively form a tubular shaped structure,
an end wall provided at a first end of said tubular shaped structure, and
an attachment edge provided opposite said end wall, wherein said attachment edge is sized and shaped to mate with an end wall of a cargo transportation enclosure,
wherein said combination of said tubular shaped structure and said end wall defines an interior space;

a cargo opening for passage of cargo therethrough, said cargo opening provided through said sidewall;

a side cargo handling apparatus and lift module comprising:
a side module floor, said side module floor having a horizontally positionable arrangement respective to said module floor,
a vertical actuator integrated with said side module floor enabling horizontal positioning of said vertical actuator in conjunction with a horizontal motion of said side module floor,
a cargo platform attached to a vertically adjustable component of said vertical actuator, said platform having an upper surface and a platform peripheral edge, and
a floor platform clearance within said module floor, said floor platform clearance extending inward from an edge of said module floor adjacent to said cargo opening, said floor platform clearance comprising a clearance peripheral edge that is sized and shaped to mate with said platform peripheral edge;

wherein said vertical actuator vertically positions said cargo platform between a container transfer position aligning said platform upper surface and said floor upper surface and a ground transfer position locating said platform upper surface below said floor upper surface.

15. A cargo handling module as recited in claim 14, said platform upper surface is substantially continuous with and uninterrupting with an adjacent section of said respective module floor of said module body shell when said cargo platform is raised to a container transfer position.

16. A cargo handling module as recited in claim 15, said module floor further comprising a side module floor clearance, wherein an upper surface of said side module floor is coplanar with an upper surface of said module floor.

17. A cargo handling module as recited in claim 14, said the vertical actuator further comprising an upright frame member slideably engaging with a vertical actuator channel.

18. A cargo handling module as recited in claim 14, said cargo handling module further comprising a releasable attachment interface provided along said module attachment edge.

19. A cargo handling module as recited in claim 14, said cargo handling module further comprising a cargo access door providing closure to said cargo opening.

20. A cargo handling module as recited in claim 14, said module floor further comprising a side module floor clearance, wherein an upper surface of said side module floor is coplanar with an upper surface of said module floor.

* * * * *